June 27, 1950 J. S. BROWN 2,513,078

BROADBAND TELEVISION ANTENNA

Filed June 19, 1947

Inventor:
John S. Brown
By: Alois W. Graf
Atty.

Patented June 27, 1950

2,513,078

UNITED STATES PATENT OFFICE 2,513,078

BROAD BAND TELEVISION ANTENNA

John S. Brown, Chicago, Ill., assignor, by mesne assignments, to Andrew Corporation, a corporation of Illinois Application June 19, 1947, Serial No. 759,612

1 Claim. (Cl. 250—33.51)

The present invention relates to antennas, and more particularly to antennas suited for satisfactory operation on all of the television channels now in use.

Heretofore it has been common practice to employ dipole antennas with or without a reflector for television reception. Such antennas operate satisfactorily only over a single television channel and hence are not satisfactory in an area or locality having more than one television station. It furthermore would be desirable for the sake of economy in manufacturing to devise an antenna suitable for installation in all localities for reception of whatever television channel is being employed whether it be in the region of 44 mc. or 216 mc.

A television receiving antenna for satisfactory results must deliver a signal to the receiver of sufficient strength to operate it satisfactorily including proper operation of the synchronizing circuit and furthermore should deliver a signal which is free from double images or "ghosts." To effect maximum power transfer to the receiver the impedance of the antenna must match the impedance of the transmission line which connects it to the receiver. Thus the antenna resistance is predetermined at the standard input-impedance of television FM receiver, and the reactance of the antenna should be a minimum. The antenna should have sufficient directional properties so that it may be oriented so as to eliminate the "ghosts" or secondary images caused by energy reaching the receiving antenna after reflection from some object.

It is furthermore desirable in an antenna of this kind to have its size and appearance such that it will not be objectionable when installed on homes or apartments. The antenna furthermore should be horizontally polarized since this is the standard provided for television transmitting stations.

It, therefore, is an object of the present invention to provide an improved television receiving antenna which will satisfactorily operate on all the television channels now in use.

A further object of the present invention is to provide an improved television receiving antenna having a simple mounting means and capable of being rotated or oriented.

A still further object of the present invention is to provide an improved television receiving antenna which is relatively economical to manufacture and which has a suitable size and appearance for installation on homes or apartments.

Still another object of the present invention is to provide an improved television receiving antenna which is horizontally polarized and which has such electrical characteristics as to effect the maximum power transfer of energy to the television and FM receiver.

Other and further objects of the present invention subsequently will become apparent by reference to the following description taken in conjunction with the accompanying drawings wherein.

Figure 1:
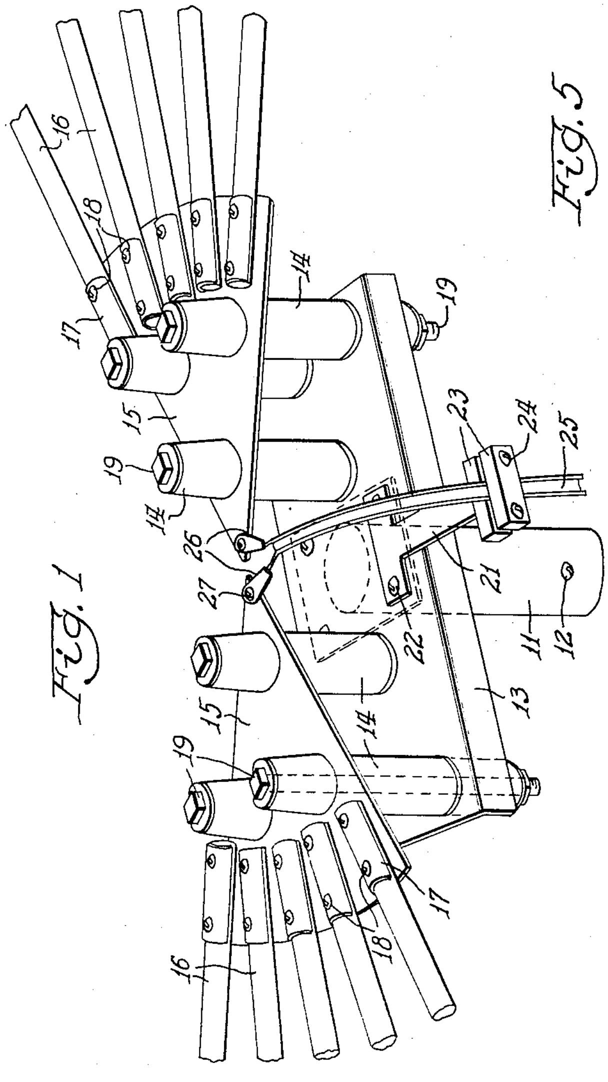
Figure 1 is a perspective view of an antenna constructed in accordance with the principles of the present invention.

Referring to the drawing it will be seen that there has been shown in Figure 1 an antenna structure supported by a tubular member 11 which is adapted to be slipped over a pipe or tubular member and secured in proper oriented position by a fastening or set screw 12. The tubular member 11 supports a channel member 13 which carries a plurality of insulators 14. Three of the insulators 14 support a triangular plate 15 which in turn carries a plurality of antenna rods 16. The antenna rods 16 are placed in fan formation and each rod is held in position by a clamping member 17 secured by screws 18. It will be appreciated that each of the insulators 14 is formed in a plurality of sections, one section extending below the channel 13, another section extending between the channel 13 and the plate 15, and a third section extending above the plate 15. Suitable apertures are formed in the channel 13 and each of the plates 15 to provide adequate insulation between the plates and the fastening bolts 19 which hold the assembled insulators and plates in position. The channel 13 carries a support plate 21 secured in position by screws 22. The outer extremity of the plate 21 carries insulator bars 23 for clamping and holding in position by means of screws 24 a transmission line 25.

In one embodiment the triangular sectors 15 had a radius of five and seven-eighths inches. These triangular plates or sectors 15 were mounted on insulators which supported the plates two inches above the channel support plate 13. Each of the rods 16 extended beyond the outer edge of the plate 15 approximately fifty-four inches.

It will be noted that five elements or rods 16 were provided for each sector 15 since a fewer number would not provide the desired standing wave ratio. The sector plate 15 in the particular embodiment referred to covered an angle of fiftytwo degrees so that the elements 16 cover an angle of forty-five degrees.

Figure 2:
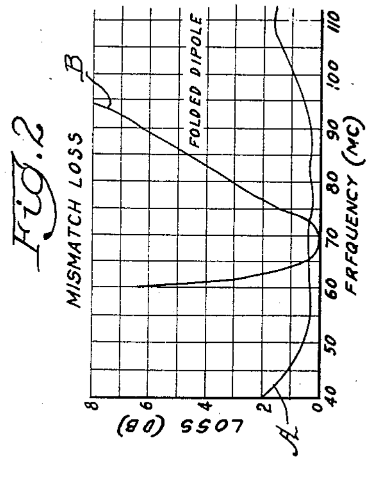
Figure 2 is a graphical representation of the efficiency of the present antenna over a wide range of frequencies.

By referring to Figure 2 it will be noted that the antenna constructed in accordance with the embodiment of Figure 1 is greatly superior to a folded dipole antenna. The curve in Figure 2 shows a comparison between the mismatch loss introduced by the folded dipole and the mismatch loss introduced by the antenna of Figure 1. This mismatch loss is expressed in decibels which is the ratio of the power actually transferred from the antenna to the transmission line compared to that power that would be delivered to the line if the line and the antenna were perfectly matched. The relatively flat characteristic of curve A which corresponds to that of the structure shown in Figure 1 clearly shows the superiority over curve B which corresponds to the curve of a folded dipole.

By having the antenna of Figure 1 supported so that it may be oriented, it is possible to eliminate "ghost" signals which are caused by the reflection of transmitted energy from some object. "Ghost" signals can also be caused by re-reflection in the transmission line. Since the impedance match between the line and the terminals of the television receiver can never be made perfect, a portion of the signal is reflected at the receiver terminals which travels back up the line and is re-reflected at the antenna to again return to the receiver in the form of a second image displaced from the first. The percentage of the received signal which will be reflected back at the line from the receiver therefore, depends on the degree of mismatch between the receiver input impedance and the transmission line impedance. The co-efficient of reflection expresses this re-reflection characteristic which might cause a "ghost" image.

Figure 3:
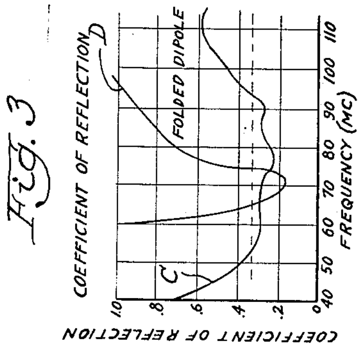
Figure 3 is a graphical representation of the characteristics which minimize a reflection of the incident signal which otherwise might cause a "ghost" image.

Figure 3 shows a comparison of the co-efficient of reflection of a folded dipole by curve D as compared to the curve C which illustrates the characteristic of the antenna of Figure 1. Again it will be noted that over the frequency range given in the graph, the curve C is much flatter and lower than curve D, thus indicating that a relatively good impedance match has been obtained between the antenna and the transmission line.

Figure 4:
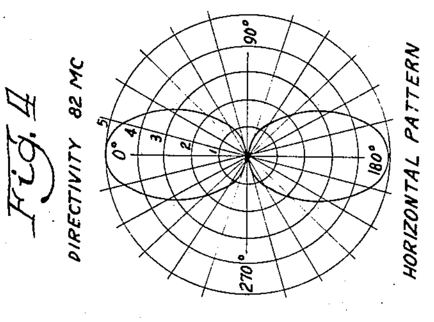
Figure 4 is a horizontal directivity pattern at one frequency of operation.
Figure 5:
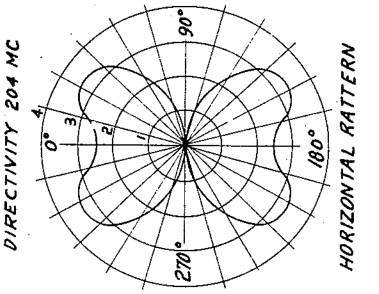
Figure 5 is another horizontal directivity pattern at another operating frequency.

As previously mentioned the orientation of the antenna is employed for eliminating the "ghost" images where the signal has been reflected from other objects. Figure 4 graphically portrays the directivity characteristic of the antenna of Figure 1 at a frequency of 82 mc. Throughout the lower frequency ranges and over the major portion of the operating range of the antenna, the antenna has the characteristic figure 8 directivity pattern similar to that shown in Figure 4. At the high frequency band the directivity pattern deviates from the figure 8 by the formation of lobes so that the pattern appears as illustrated in Figure 5. It will be noted, however, that the nulls of the antenna are still sufficiently sharp to serve in reducing "ghost" images.

In the commercial embodiment of the antenna illustrated in Figure 1 the transmission line 25 consists of a twin lead extruded polyethylene insulated transmission line sixty feet in length having an impedance of 300 ohms. The conductors of the transmission line 25 are connected to the apexes of the sectors 15 by suitable lugs 26 held in position by screws 27.

From the foregoing it will be appreciated that in accordance with the present invention there has been provided a broad band antenna having a double fan shaped configuration formed by radial copper wires or tubes supported by a sheet copper fan or sector. Favorable electrical characteristics consistent with mechanical and economic limitations have been obtained. From the construction shown in the drawing it will be noted that the antenna is readily demounted so as to be conveniently packed for sale and distribution. In spite of the fact that the various components of the antenna are arranged to be assembled by the use of simple tools such as a screwdriver and wrench, the mechanical strength is adequate and no breakage or loosening of the parts occur.

While in the commercial embodiment illustrated, a certain number of rods and certain angles have been mentioned, other embodiments have been employed including a greater number of rods and a greater angle up to one hundred and twenty degrees for each sector. It, therefore, will be appreciated that for the frequency ranges mentioned the rods have been employed to simulate electrically a plane. Where the frequency range is up in the microwaves, it is possible to dispense with the rods and to utilize the two sectors of proper dimensions. It, therefore, will be appreciated that these and other variations may be made in the antenna structure.

While for the purpose of illustrating and describing the present invention, a preferred embodiment has been shown in the drawings, it is to be understood that the invention is not to be limited thereby since such variations in the construction and in the components employed are contemplated as may be commensurate with the spirit and scope of the invention set forth in the accompanying claim.

What I desire to protect by United States Letters Patent is claimed as follows:

A horizontally polarized directional antenna for television reception comprising a horizontal base, a pair of horizontal sector support members, a plurality of insulators supporting said sector support members above said base in diametrically opposite positions, a plurality of rods removably mounted on said sector support members, said rods extending in radial formation at equal intervals of not more than 12°, and means for connecting a line conductor to the apex of each sector support member.

JOHN S. BROWN.

REFERENCES CITED

The following references are of record in the file of this patent:

UNITED STATES PATENTS

| Number | Name | Date |
|---|---|---|
| 2,064,774 | Wheeler | Dec. 15, 1936 |
| 2,268,640 | Brown | Jan. 6, 1942 |
| 2,299,218 | Fener | Oct. 20, 1942 |
| 2,430,664 | Bradley | Nov. 11, 1947 |

FOREIGN PATENTS

| Number | Country | Date |
|---|---|---|
| 524,457 | Great Britain | Aug. 7, 1940 |
| 248,597 | Great Britain | Mar. 11, 1926 |
| 877,658 | France | Dec. 14, 1942 |

OTHER REFERENCES

Antennas for Television Receivers, by E. Noll, published in Radio News, May 1945, pages 40–42, 130 and 132.

Prospectus released by Andrew Co., Bulletin 45, copyright obtained October 14, 1946.